United States Patent [19]

Jury

[11] Patent Number: 5,820,910
[45] Date of Patent: Oct. 13, 1998

[54] MOLDING OF FAT-BASED CONFECTIONERY SUBSTANCES

[75] Inventor: Mark Jury, North Yorkshire, England

[73] Assignee: Nestec S.A., Vevey, Switzerland

[21] Appl. No.: 612,056

[22] Filed: Mar. 7, 1996

[30] Foreign Application Priority Data

Mar. 8, 1995 [GB] United Kingdom .................. 9504686

[51] Int. Cl.$^6$ ........................................................ A23G 1/20
[52] U.S. Cl. ........................... 426/516; 426/104; 426/512; 426/660
[58] Field of Search .............................. 426/98, 512, 660, 426/513, 104, 103; 425/205, 308, 382.4

[56] References Cited

U.S. PATENT DOCUMENTS

| | | |
|---|---|---|
| 4,014,156 | 3/1977 | Klahn et al. . |
| 4,426,402 | 1/1984 | Kaupert . |
| 5,439,695 | 8/1995 | Mackley . |

FOREIGN PATENT DOCUMENTS

| | | |
|---|---|---|
| 0395756A | 7/1990 | European Pat. Off. . |
| 223362 | 10/1924 | United Kingdom . |
| 385571 | 3/1931 | United Kingdom . |
| 1378253 | 12/1974 | United Kingdom . |
| 1604585 | 12/1981 | United Kingdom . |

OTHER PUBLICATIONS

Minifie, Chocolate, Cocoa, and Confectionery: Science Technology Third Edition, Chapman & Hall, New York, 1989, pp. 183, 198–207.

Beckett, et al., Industrial Chocolate Manufacture and Use, Second Edition, Blockie Academic & Professional, London, 1994, pp. 211, 228–231, 321, 327–329.

*Primary Examiner*—Lien Tran
*Attorney, Agent, or Firm*—Vogt & O'Donnell, LLP

[57] ABSTRACT

Shaped fat-based confectionery articles are prepared by extruding and issuing a fat-based confectionery substance, particularly set chocolate, under pressure and at a temperature below the pour point of the substance into a mold cavity having at least one cavity surface lined with a lining material so that the lined mold cavity is filled with extrudate, releasing the mold from the extrusion pressure and demolding the lining material and molded article.

17 Claims, 2 Drawing Sheets

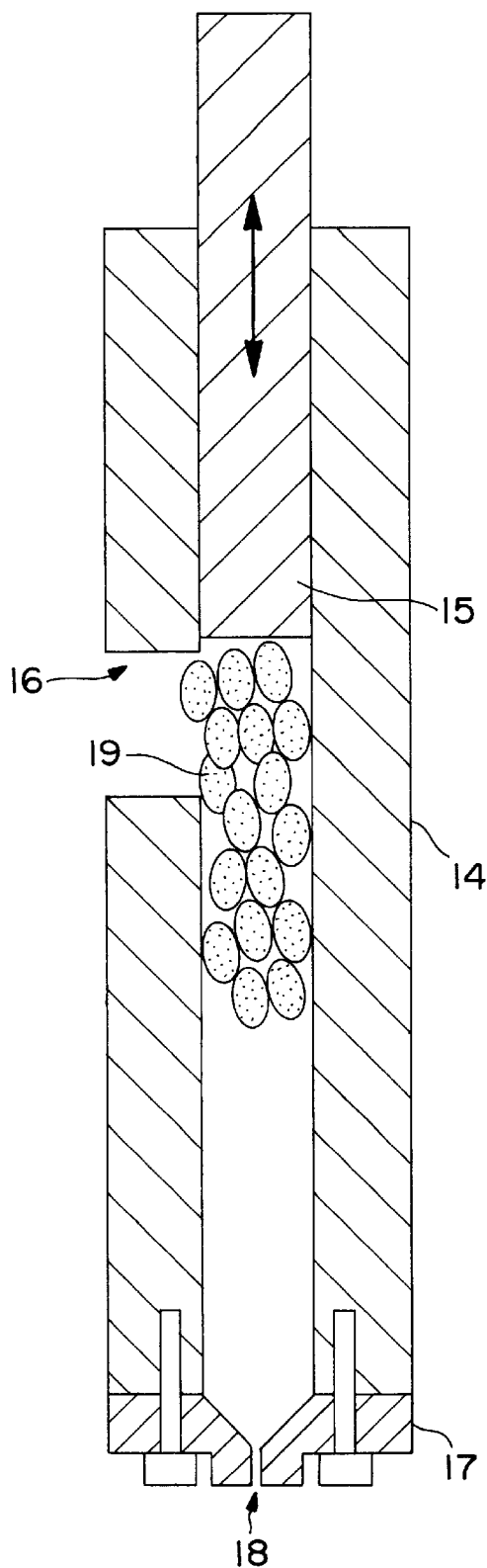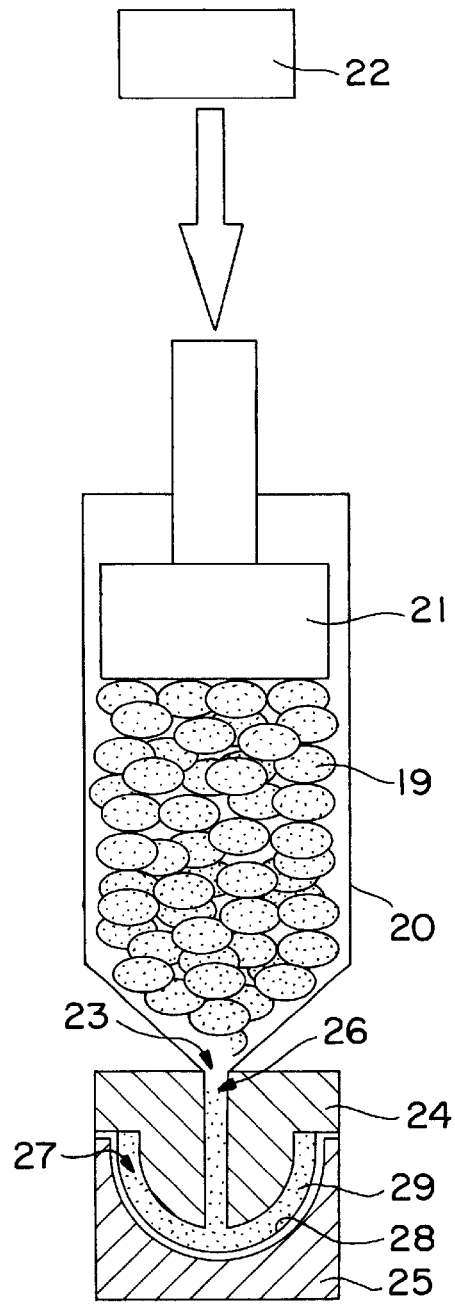
FIG. 1
FIG. 2

MOLDING OF FAT-BASED CONFECTIONERY SUBSTANCES

BACKGROUND OF THE INVENTION

The present invention relates to preparation of shaped articles of fat-based confectionery substances, particularly chocolate substances, and particularly to molding means and methods for preparing the fat-based substances into shaped articles, including extrusion and molding of the substances, and to preparation of such shaped articles in packaging materials.

Fat-based confectionery products and substances, as meant herein, are products and substances which themselves are eaten on their own merit, rather than being utilized as an ingredient or an intermediate for preparation of another product intended for ingestion by the consuming public. Such products contain fat per se and/or fat analogs, fractions and substitutes thereof and generally include other ingredients in various proportions such as sugar, milk and milk-derived components, and/or solids from vegetable sources, for example, and chocolate products, in particular, provide a not insubstantial amount of the total amount of fat-based confectionery products produced for retail sale and consumption worldwide.

Preparation of fat-based confectionery products in a shaped form, particularly if a decorative form is sought, generally requires a molding operation. Typically in a commercial production setting, operations for preparing such products involve heating ingredients to provide a fluid, pourable form for introduction into a mold. After introduction into the mold, the fluid product then is cooled to set the product so that it retains its molded shape. Such heating and cooling operations however are expensive in terms of equipment utilization and energy requirements, and thus, there long has been need for improving cost and operational efficiency when processing fat-based confectionery substances, particularly chocolate, for obtaining shaped articles.

Molded chocolate products, for example, generally are prepared industrially by conching a ground chocolate ingredient mixture paste at a temperature of from about 50° to about 85° C. and by tempering the conched chocolate, which provides a fluid, pourable mass, and then, because of viscosity considerations, the fluid tempered chocolate generally is directed immediately to a molding operation for final product preparation.

As is known, although cooling is carried out during tempering, correct tempering procedures generally require that the chocolate have a temperature on the order of from about 27° C. to about 33° C., depending upon the chocolate composition and character. In addition, when using tempered chocolate in a molding operation, temperature control of the mold also is important, and in general, heating and cooling operations are required.

When molding tempered chocolate, if the mold temperature is less than the temperature of the tempered chocolate, the chocolate adjacent the mold surface tends to contract at a rate different from the remainder of the chocolate in the mold which, in turn, tends to result in rough product surfaces and/or demolding problems and/or poor gloss. On the other hand, if the mold is too hot, the chocolate may lose its temper at least partially, which tends to result in poor contraction during cooling and/or in producing a product having a poor surface-finish. Thus, the molding operation, therefore, generally requires heating a mold to a temperature which substantially corresponds to that of the tempered chocolate.

After filling the mold cavity, cooling is carried out to set the chocolate, generally with such as with a cooling tunnel assembly or with a multi-tier cooler, as are known in the art. Generally accepted practice to obtain a properly set and glossy product requires cooling the mold and chocolate to a temperature on the order of from 10° C. to 20° C. However, the rate of cooling also is of importance, not only because of cooling contraction considerations, but also because an at least initial gradual controlled cooling should be employed so that the final product does not exhibit or tend to develop, prematurely, fat bloom. Thus, generally, obtaining a properly set product requires a cooling cycle time on the order of from about 20 minutes to about 30 minutes, which is production limiting and expensive in the context of equipment and energy requirements, particularly when accommodations must be made also for a mold heating operation.

Illustrative of a method for molding chocolate which does not involve mold heating is that disclosed by Kaupert, U.S. Pat. No. 4,426,402, wherein molten chocolate is introduced into a mold cavity of a two-part mold assembly having a specially designed product retaining and handling member associated therewith and wherein a top mold portion is cooled to a substantially lower temperature than the lower mold portion so the top surface of the chocolate solidifies rapidly so that the initially solidified shaped chocolate can be removed by means of the retaining and handling element for further cooling.

Illustrative of a method for preparing a confectionery having such as a chocolate shell contained in wrapping material is that disclosed by Klahn, et al., U.S. Pat. No. 4,014,156, wherein a flowable confectionery material is introduced into an open-top mold lined with a wrapping material, the assembly is spun to coat the wrapper with the confectionery material, and then, the wrapper-contained product is cooled.

Although extrusion of various fat-based confectionery products have been proposed, such processes, too, generally also employ cooling and heating devices auxiliary and/or integral with the extrusion apparati, and although extrusion and pressing of chocolate have been mentioned in the art, such as in British Complete Specifications Nos. 223,362, 385,571 and 1 604 585, it is not believed that any of these processes have found application, particularly in a commercial mass production setting, without the aid of auxiliary heating and cooling devices.

One significant advance in the art which addresses the problems associated with the inefficiencies of heating and cooling means employed in the art is described in Mackley, U.S. application Ser. No. 08/281,866, now U.S. Pat. No. 5,439,695 (hereinafter "the '695 Patent"), wherein a fat-based confectionery substance, particularly chocolate and more particularly solid set chocolate, is introduced into an extruder having a zone of convergence and an extrusion die outlet and passed under pressure and at a temperature below its pour point temperature through the extruder to and through the zone of convergence and the outlet to deform and plasticize the substance and extrude a plasticized extrudate from the outlet so that the substance deformed, plasticized and extruded has a temperature below the pour point temperature of the substance, this process having the advantage of being carried out without the need for any heating or cooling means.

As described in the '695 Patent, plasticity is imparted to the substance and the extrudate retains the plasticity, i.e., is plastically deformable, for a period of time prior to setting to a set, or hardened, state in which it retains its form, the properties of the set state, e.g., yield-stress and brittleness, being, under equivalent temperature conditions, substantially equivalent to that of the substance which was processed. By operating in accordance with this process, an axially homogeneous extruded product having a cross-section which is substantially the same as profile as an extruder die outlet orifice from which it is extruded may be obtained, and in view of its plastic flexibility, the extrudate may be molded or further formed and shaped.

In the course of my work, however, it was found that when operating in accord with the process of the '695 Patent to prepare molded articles, although no mold heating means is required, because of the isothermal nature of the process, the molded articles did not tend to demold cleanly prior to returning to the set state without cooling, since there is no substantial contraction of the articles. Thus, to obtain consistently efficient and clean product mold-release and to assure product configurational integrity, particularly in the context of articles having complex shapes, e.g., pluralities of intersecting curvatures or surfaces, it was found that it was advisable to cool the mold to an extent so that the article contracted in the mold to effect release from the mold. Although it was found that the cooling requirements, i.e., temperature and time, to effect contraction are substantially less than that theretofore employed in the chocolate molding art, a temperature decrease on the order of more than 5° C., and generally of from about 6° C. to 7° C., which may be effected on the order of about 1 minute or somewhat more, is required to contract the article to obtain uninhibited, clean mold release without creation of product imperfections or defects or configurational reformation.

Hence, further effort has been directed to finding a means to at least reduce the degree of cooling necessary and/or the time required for cooling in a molding operation, if not eliminate a cooling operation entirely, and thereby reduce or avoid the attendant equipment and energy expense and to increase mold utilization and production rates by reducing, if not eliminating, a cooling period.

SUMMARY OF THE INVENTION

The present invention provides a process which employs the extrusion process of the '695 Patent but which, at the least, reduces cooling time and its attendant inefficiencies and which can enable avoiding cooling entirely. Furthermore, the process of the present invention is not delimited by considerations of shape complexity and thereby reduces product loss due to imperfections or defects, including those caused by article handling elements known in the art, and mold utilization rate is increased and mold cleaning requirements are substantially reduced.

For purposes of this disclosure, including the claims, the disclosure of the '695 Patent is incorporated herein by reference as if fully set forth herein.

In accordance with the present invention, the extrusion process of the '695 Patent is carried out and the fat-based extrudate formed by an extruder means is issued into a mold which is lined with at least one sheet of a food-acceptable material to fill the lined mold cavity portion and then, the molded article and lining material are demolded. Advantageously, the lining material is suitable as a packaging material, which enables an integrated and substantially simultaneously operation of product preparation and retail packaging.

Thus, the present invention comprises a process wherein at least one surface of a two-part mold which defines a mold cavity portion (hereinafter "cavity") is lined with a lining material, a fat-based confectionery substance, especially a set chocolate, is extruded and issued under pressure and at a temperature below the pour point of the substance into the two-part mold to fill the lined mold cavity with extrudate to obtain a shaped article in the mold, the filled, lined mold is released from extrusion pressure and the lining material and the molded article are demolded. Advantageously, the extrudate is separated into a plurality of separate flows, and each separate flow is issued into a separate lined mold, each lined mold is filled, each filled, lined mold is released from extrusion pressure, and the lining material and each molded article are demolded. Thus, the extrusion and molding process may include such as rotary assemblies which carry a series of molds so that filling and demolding operations may be carried on simultaneously.

DETAILED DESCRIPTION OF THE INVENTION

Although the present invention is employed particularly usefully with chocolate, other confectionery substances which comprise at least fat (which is intended to mean also edible oil) and/or fat analogs, fractions, and/or substitutes thereof (hereinafter solely "fat") also may be processed. The fats employed may include, but are not intended to be limited to, for example, cocoa butter, including hardened or hydrogenated butters and/or edible fats, and/or stearines, coconut oil and/or palm oil. Included in the fat-based substances in varying proportions may be ingredients such as sugars, sugar substitutes, milk, milk-derived solids, other proteinaceous substances and derivatives thereof, vegetable solids and/or other various confectioner's ingredients and fat-based compositions.

When the fat-based confectionery substance is a chocolate, it is a set chocolate and may be plain, dark, milk or white chocolate, and the confectionery known as CARA-MAC candy is exemplary of a non-chocolate substance which may be made usefully in accord with the invention. In addition, nut pastes, including such as peanut butter, for example, also may be processed in accordance with the present invention.

The term "fat-based" confectionery substance is intended herein to mean compositions which comprise a continuous phase, or matrix, of fat. Such substances, in general, comprise fat in an amount of at least about 15% by weight. The substances processed in accordance with the present invention preferably contain at least about 20% by weight fat and may contain up to about 85% to 90% by weight fat, although higher amounts are not intended to be precluded. In general, products prepared in accordance with the present invention will contain from about 25% to about 50% by weight fat and more usually, from about 30% to about 45% by weight fat.

In addition, the present invention may be employed to prepare multi-component, or composite, products. For example, two or more fat-based confectionery substances may be extruded and issued into a lined mold in accordance with the process of the present invention, simultaneously or sequentially, and other confectionery substances, such as caramel, praline, toffee and butterscotch, also may be introduced into the lined mold cavity.

Composite products also may include other food compositions such as ice creams, fondants, nuts, or the like, such being advantageous when a fat-based confectionery substance prepared in accordance with the present invention has a hollowed form. In the context of composite products, it is possible to utilize a two-step extrusion and molding procedure wherein a half-shell is prepared, the solid substance is introduced into the half-shell and then the remainder of the shell is molded.

In sum, the process of the present invention operates to change the shape of the fat-based substance and not its intrinsic character. Thus, the starting material itself is conveniently a desirably ingestible product. Thus, although the substance to be processed, i.e., extruded and molded, may take a variety of shapes, advantageously, the substance has a particulate form, preferably a granulate form, i.e., granules, so that it provides for solid particle flow, such as for feeding to an extruder means from such as a hopper. Also, chips or morsels or what is known in the European market as chocolate buttons may be employed.

Processing in accordance with the present invention is carried out preferably at substantially ambient room temperature, which is intended herein to include temperatures on the order of from about 16° C. to about 29° C., i.e., temperatures substantially in a range of ambient room temperatures, and in general, temperatures on the order of from about 19° C. to about 27° C., i.e., general normal room temperature ambient conditions, are employed most advantageously.

Thus, carrying out the process of the present invention provides utilization of the substantially isothermal characteristics referred to in the '695 patent, and the advantages attendant thereto, wherein the temperature of the material processed does not increase materially to effect a change in character from the non-pourable state. Although in general, a temperature increase on the order of about 1° C. or less may be noted when operating in accordance with the present invention, in some instances, such as extrusion at high linear speeds, a somewhat greater temperature increase, on the order of up to about 5° C., for example, may result, but even in such cases, that is not considered to be substantial temperature change and is still considered to be substantially isothermal, as long as the temperature of the substance processed has not reached the pour point of the substance and does not change to a pourable phase, as also referred to in the '695 Patent. Thus, in the process of the present invention, the physical state of the substance is such that its general deformation behavior during extrusion and molding alters only from that of a set form to that of a plastic nature rather than to that of a viscous fluid, and such is deemed to be substantially isothermal.

Thus, notwithstanding that processing at temperatures of from about 16° C. to 29° C., and particularly from about 19° C. to 27° C. provides substantial advantages, a broad range of temperatures, including temperatures of from about 0C to about 35° C., may be employed to effect the extrusion and molding process of the present invention, particularly in the case of set chocolate, as long as the temperature of the fat-based substance processed remains below the pour point temperature of the substance. Thus, operation in accordance with the present invention is not intended to preclude processing at a temperature up to below the pour point temperature of the substance, which may be, particularly in the case of set chocolate, up to about 35° C. depending on its composition, particularly depending on the amount and type of fat present. As will be appreciated, such higher temperatures may be employed when the confectionery substance contains higher proportions of high-melting fat. Therefore, in the context of processing at other than an ambient room temperature, it is possible to equilibrate the chocolate (and the processing equipment) to such temperatures prior to processing, i.e., prior to extrusion and molding, with cooling or heating means, provided such as by jacketing an extruder and/or mold means, the use of such means not being intended to be precluded in the context of processing substances in accordance with the present invention.

In carrying out the extrusion and molding operation of the present invention, a mold enclosure is employed which is suitable for containing the substance under and withstanding the pressure of extrusion. Although described herein with reference to a two-part mold, a mold having more than two mold parts is not intended to be precluded, and the term "two-part mold" is intended to mean "at least" two parts, and each part may have divisible portions. Selection of pressure for processing is made with reference to the composition of the substance processed and the equipment employed, but in general, the substance may be subjected in an extruder means to a pressure of from about 20 bar to about 1000 bar.

In carrying out the molding operation of the present invention, the fat-based substance, e.g., set chocolate, extrudate is issued integrally from extrusion means into a mold cavity, i.e., either directly from an extruder means to a mold or via conduit lines from the extruder means to the mold. The extrudate is issued for introduction into the cavity so that it has a cross-sectional size of from about $100\mu$ to about 7 mm and preferably about 1 mm to about 5 mm and most preferably from about 2 mm to 3 mm. Depending upon the composition of the substance processed and/or equipment arrangement and/or article configuration, it may be desired to pass the extrudate through a flow constriction prior to its introduction into the mold cavity to delimit, within the ranges disclosed above, the cross-sectional size of the flow introduced into the cavity to a size different from a size issued to or through a mold part to the mold cavity.

In the present invention, when a flow constriction, or gate, is employed, it preferably is integrated with a walled mold passage, or runner, leading to the mold cavity injection point and is positioned preferably immediately adjacent the mold cavity, i.e., at and defining the mold cavity injection point. As will be appreciated, as the cross-sectional size of the injection point is decreased, the article portion formed at the injection point will become smaller and hence, less visible. However, in general, under equivalent conditions, as the cross-sectional size of the injection point or other place of flow constriction to the mold is decreased, the substance is subjected to more shear which generally tends to make the extrudate more plastic and flexible. Thus, depending upon the substance composition, in general, although chances of an article being deformed during demolding because of the force required to detach the article at the injection point increase with the size of the injection point, less shear yields an initially harder, less flexible article. Thus, flow constriction, or mold gate, in a mold passage leading the mold cavity desirably is not employed.

Most practically, the extrudate delivered by the extruder means from its zone of convergence and extrudate outlet is separated into a plurality of flow streams which each pass to a separate mold with or without further flow constriction as described above. Thus, a plurality of articles may be made simultaneously and/or sequentially.

In carrying out the molding operation of the present invention, a lining material is positioned on at least one surface of a mold which defines at least the mold cavity to cover the surface(s) so that the lining material separates the fat-based substance introduced into the mold from the mold cavity surface(s). As will be appreciated, the lining material is configured most conveniently to extend from the cavity so it may be gripped between two mold parts.

The lining material may be formed into a shape of the mold cavity either in situ or ex situ of a mold. Thus, the lining material may have a portion formed into the shape of the mold cavity under the pressure of the extrudate issued from the extruder means. Alternatively, a mold part may be configured to draw a vacuum to shape the lining material to conform with the mold cavity surface portion of the mold part prior to extrusion, and a second mold part may be configured for introduction of the extrudate into the lined cavity part. When formed ex situ, means such as a vacuum forming tool, such as is known in the packaging art, or a mold part, may be employed so long as the shape and dimensions of at least a portion of the lining material are formed to correspond with the mold cavity surface onto which it will be placed and so it may be retained in the mold for operation of the extrusion and molding process.

Thus, the lining material should be sufficiently flexible, or resilient, or ductile, so that it may be formed into a shape which conforms with the shape of the mold cavity surface. A lining material is acceptable as long as it does not have, for example, a rigidity which prevents it from deforming under the pressure of extrusion to conform to the mold cavity surface or which prevents it from otherwise being formed in situ or ex situ.

The lining material should have a composition which renders it substantially non-adherable to the material of the mold so that it, and thus the molded product it contains, may be demolded readily from the cavity surface. Likewise, the lining material should have a composition which renders it food-acceptable and substantially non-adherable to the molded product so that the molded product may be removed from the lining material readily. Thus, as will be appreciated, by selecting a lining material which does not adhere to the mold or to the molded product, a molded product contained within a "skin" of lining material may be demolded easily from a mold cavity and the skin can be peeled away from the confectionery product.

As will be appreciated, any of a plurality of plastic and metallic materials address the afore-noted specifications and the lining material, of course, should be, if used for packaging also, one which enables the product to have a commercially acceptable shelf-life, e.g., having barrier properties which, in the context of the product, address considerations of permeability to moisture and oxygen and extraneous odors and thereby, considerations of avoiding product deterioration over long-term storage, e.g., up to and/or exceeding 9 months.

Polymer film materials usefully employed may have a thickness of from about $5\mu$ to about $1500\mu$. Such polymer films may be unoriented, or uniaxially or biaxially oriented. Films having good food protection barrier properties may have a thickness of from about $5\mu$ to about $500\mu$, preferably from about $10\mu$ to about $100\mu$, and more preferably, from about $15\mu$ to about $50\mu$. Polypropylene and linear low density polyethylene sheet are examples of flexible plastic polymer films usefully employed, and polyethyleneterephtalate (PET) may be employed, as may CLINGFILM sheet. More rigid, generally vacuum-formable-type plastic materials may have a thickness of from about $50\mu$ to about $1500\mu$, and preferably from about $200\mu$ to about $400\mu$. Polyvinyl chloride (PVC) is an example.

Metallized plastic polymer films may be used, e.g., metallized polypropylene, particularly when the liner is employed as a packaging material.

Suitable lining materials also include metallic materials such as aluminum, and in such cases, the lining material may have a thickness of from about $10\mu$ to about $500\mu$, and generally, from about $50\mu$ to about $200\mu$.

If desired, laminates may be used to line the mold and may comprise two or more sheets of plastic polymer materials, and although such as two rigid vacuum-formable plastic material sheets may be employed, a combination of rigid vacuum-formable plastic material and a thin flexible plastic material is employed usefully and may include such as a PVC and polyethylene laminate wherein the PVC has a thickness of from about $250\mu$ to about $400\mu$ and the polyethylene has a thickness of from about $25\mu$ to about $100\mu$. Alternatively, a laminate may comprise a plastic polymer material, such as polyethylene or polypropylene or PET and a metallic material or a metallized film.

As indicated above, in an advantageous embodiment, the lining material may be selected to provide the retail packaging material for the molded product, which eliminates need for the application of packaging material downstream, and thus, the lining material may bear printing of product designation and origin and other product information and marketing decoration. In carrying out this embodiment, a heat-sealable material, such as a polyethylene or PET, may comprise the lining material alone, but preferably such is combined with a metallized film or a metallic material to provide a laminate. In this embodiment, two halves of a molded product, each contained in the lining material, may be placed together so that the edges of the lining material mate. The matable edges then are heat-sealed by such as contacting the edges with heated metal strips or with other sealing means known in the art, including heat-sealing equipment manufactured by HAWO of Germany.

In the interest of production rates and in the context of further advantages discussed below, the lining material is formed ex situ of the mold. Thus, as indicated above, portions of a sheet of lining material may be preformed into a desired shape with a vacuum-forming tool by pulling a vacuum on the material to conform a portion of the sheet to a shape of a mold cavity into which the preformed sheet portion will be placed for introduction of the extrudate thereon. When the lining material is a plastic material, it may be heated to make it more readily deformable. In addition, the lining material may be formed so that any nipple(s) caused by vacuum pulling will be positioned on the inside of a package of a finished product.

The shaped lining material then may be transferred to a mold assembly so that each shaped lining material portion is placed in a like-shaped mold cavity. A second mold part then is placed over the lined cavity so that a cavity is formed between the sheet and the second mold portion and so that portions of the lining material are positioned and held by portions of the mold adjacent the cavity portion, and the extrudate is introduced via the second mold portion into the cavity. As will be appreciated, this embodiment is particularly useful for forming halves of articles, particularly hollowed articles, and if any rough surfaces are caused by the second mold part, they are not of particular consequence, since this portion of the article is an interior portion not visible in the finished article.

In addition, in practice of the ex situ lining material formation embodiment of the present invention, a continuously extending sheet enables the lining material to be employed readily as a carrier to transport the molded articles to further manufacturing steps, which may include such as filling with a fondant or other composition before removal of the article from the lining material.

As will be noted in practice of the present invention, as indicated above, the extrudate and molded article have a plastic, flexible nature which is retained for a period of time on the order of, when operating at temperatures of from about 16° C. to 29° C., from 5 minutes to 4 hours, although generally up to one hour, before returning to its set state, which is the state of the fat-based substance prior to processing. Thus, the molded article is malleable and has less resistance to a change of shape than in the set state and is subject to deformation by force which would not deform the article in its set state. Cooling, as described below, will operate to reduce the time of plastic flexibility and hasten return of the article to the set state so that it has a resistance, at any given temperature, to deformation substantially equivalent with that of the fatbased substance prior to processing. However, when a lining material is employed which is substantially rigid at temperatures of from about 16° C. to about 30° C., or higher, by reason of its thickness and/or composition, cooling may be avoided entirely.

Thus, in an embodiment in which cooling is avoided, the lining material preferably should have, at a temperature of about 30° C., a tensile strength, or rigidity, which is at least sufficient so that upon removal of the lining material and molded article from the mold, deformation of the lining material due to the weight of the molded article by the force of gravity is avoided, such herein defining "static demolding". Thus, in this case, the lining material and molded article may be displaced from the mold integrally, and the lining material provides a static carrier, i.e., retaining the molded article substantially statically, during the period of plastic flexibility of the article, and then, when the article has achieved sufficient rigidity, and preferably has reset, the article may be removed from the lining material. On the other hand, the period of flexibility in this embodiment may be reduced by a cooling operation, but as will be appreciated, conventional means such as cooling tunnels are not required and sprays of cooling air may be directed at the lining material and molded article to reduce the time of flexibility.

Alternatively and particularly in the case of a molded product which is produced in a retail packaging material which may not have the rigidity required for the static carrier embodiment described above, an affirmative cooling operation, i.e., application of a cooling medium, other than ambient air, directly or indirectly, preferably is performed, and thus, otherwise carrying out the process, as described herein, is doing so without affirmative cooling. Although cooling may be performed by transporting at least one part of the mold carrying the article to a cooling means for cooling the mold and article, which also does not require the conventional means noted above, the cooling is carried out preferably by mold cooling in situ, i.e., the mold accommodating means for cooling such as provision for internal flow of a cooling fluid.

In the in situ mold cooling embodiment, in particular, in contrast to conventional processing and cooling of chocolate articles which, as noted above, generally requires about 20 minutes, cooling sufficient to reduce the plastic flexibility characteristic of chocolate articles prepared in accordance with the present invention, so that the lining material and article may be removed from the mold without deformation of the article configuration, may be effected on the order of seconds, which provides economy in the context of energy requirements and enhances mold utilization rates. Moreover, the molds advantageously may be maintained throughout all processing procedures at the cooling temperature, thus providing further energy savings and enhanced mold utilization rates.

Thus, in the present invention, after filling the mold, cooling need not be carried out to an extent to effect any substantial contraction of the molded article or setting of the article and need only be carried out to an extent so that upon removal of the lining material and molded article from the mold, deformation by the force of gravity is avoided, i.e., "static demolding". Preferably, cooling is carried out to an extent sufficient so that plastic flexibility is at least reduced so that the product does not deform when subjected to forces such as employed in conventional handling and packaging procedures.

Thus, in either static demolding embodiment described above, the present invention comprises removing the molded article from the mold statically, which is intended to mean avoidance of force or implements which cause deformation of the configuration of the article, and for increased mold utilization rates, the demolding is carried out most advantageously before the article assumes its set state.

In general, particularly when extruding and molding set chocolate at a temperature of from about 19° C. to 27° C., after filling of the mold, sufficient rigidity for static demolding is imparted to the molded article when it is affirmatively cooled in a mold having a temperature of from about 8° C. to about 15° C. and preferably from about 9° C. to about 12° C. for a time sufficient to reduce flexibility to obtain the noted static condition. Although affirmative cooling may be carried out for about one minute, which will substantially suppress the plastic flexibility, sufficient flexibility reduction may be effected by affirmative cooling of the molded article, at mold temperatures of from about 8° C. to about 15° C. for a time of less than 30 seconds and such as from about 2 seconds to about 20 seconds. At cooling temperatures on the order of from about 12° C. to about 15° C., affirmative cooling may be carried out for from about 5 seconds to about 20 seconds, and at cooling temperatures of from about 8° C. to about 12° C., affirmative cooling may be carried out for from about 2 seconds to about 15 seconds and generally for about 2 seconds to about 10 seconds.

In any of the various molding embodiments, the molding apparatus should provide for venting air from the mold cavity to enable complete filling and product shape consistency, which may be provided by mold vent channels. Demolding of product may be effected or augmented by any of various means including simply tapping out the product or by the use of pin or air demold systems or suction systems or combinations thereof.

In operation, particularly, in the case of processing a set chocolate, the extrudate issues into a lined mold as a flexible filament of plasticized chocolate, or as a front of material. As the extrusion continues, owing to the post-extrusion flexibility of the chocolate, the lined mold cavity progressively fills until all of the cavity void is filled. At this point, the pressure within the mold is sufficient to allow the full consolidation of the chocolate to occur. When this point has been reached, no further flow occurs and the extrusion pressure can be released and the mold can be opened.

The following Examples and description of the accompanying drawing Figures are presented to illustrate the present invention further and are meant to be non-limiting.

BRIEF DESCRIPTION OF THE DRAWINGS

FIG. 1 illustrates an extruder embodiment for carrying out the process of the invention.

FIG. 2 illustrates a further extruder embodiment associated with a mold assembly arrangement.

DETAILED DESCRIPTION OF THE DRAWINGS

Figure 3:
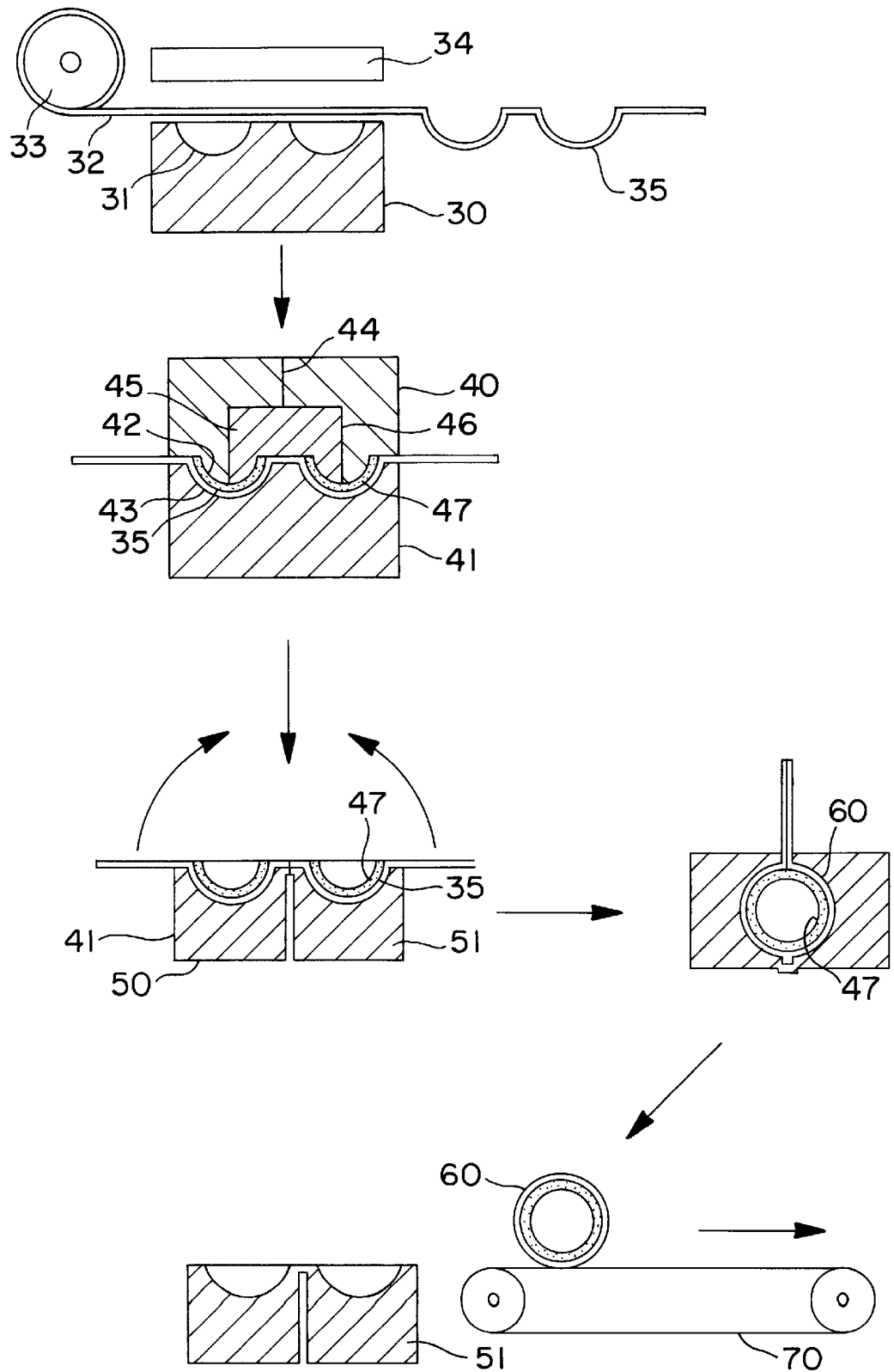
FIG. 3 schematically illustrates operations for forming a lining material, for molding articles in mold cavities containing the formed lining material and forming the molded article and lining material to provide a packaged product.

FIG. 1 is illustrative of apparatus such as a hydraulically driven ram extruder, such as a type known as a FLORIN extruder, and is constructed to withstand the extrusion pressures employed. The extruder has a barrel 14, a ram 15, feed opening 16, extrusion die member 17. The extrusion die member forms a zone of convergence which leads to outlet orifice 18. The ram is preferably hydraulically driven, and material to be processed, as designated 19, is fed via opening.

For carrying out the process of the present invention, the hollow of barrel 14 may have a cross-section diameter of about 25 mm, and the outlet orifice may have a cross-section diameter of about 4 mm.

FIG. 2 illustrates a hollowed cylinder 20 and a piston 21, which advantageously are made of metal to withstand the extrusion pressure employed. Piston 21 is connected with a hydraulic pump 22 for driving the piston in the cylinder 20 to generate the required pressure on the substance 19. The cylinder, which may have an internal diameter of about 80 mm, extends via a zone of convergence to an outlet opening 23, which may have a cross-section diameter of about 4 mm. A hinged mold is comprised of parts 24 and 25. Mold part 24 is provided with a hollowed portion which provides a feed runner 26 which is sealably connected with the cylinder 20 so that the feed runner 26 communicates with and extends from the cylinder opening 23. Both mold parts 24 and 25 are configured to provide, when closed as illustrated, a cavity 27 which, although illustrated in cross-section, is hemispherical in shape and which is in communication with feed runner 26. Positioned in the shell cavity is a food-acceptable material film 28 onto which extrudate 29 is deposited.

Included in the FIG. 3 schematic is a depiction of a vacuum-forming tool member 30 having shaped surfaces 31 which form cavities. A sheet 32 of lining material, such as a plastic such as polyvinyl chloride, is provided by reel 33 and passed above tool member 30 and below heater 34. In operation, sheet 32 is heated by heater 34 and a vacuum is pulled on heated sheet 32 via tool member 30 by means not shown to form portions of the sheet into a shapes which conform with mold surfaces 31. Upon completion of this operation, the vacuum is released, and tool member 30 is displaced in a direction away from the formed sheet to remove the tool from the formed sheet portions and allow advance of sheet 32 having formed portions 35 for forming further portions.

Sheet 32 having formed portions 35 is transported to separable hinged mold parts 40 and 41 (illustrated in a closed position) having, respectively, convex and concave surface portions 42 and 43 which correspond with the shape of formed sheet portions 35 and which provide a cavity therebetween. Mold surface 43 is shaped so that sheet portions 35 may be placed thereon without deformation. A runner passage 44, like that illustrated in FIG. 2, is positioned for communicating with a extruder outlet (not shown) of such as an extruder of FIG. 1 or 2. Feed line passages 45 and 46 provide a path for extrudate to pass from runner 44 through surface 42 to the mold cavity.

Thus, in operation, when the mold parts 40 and 41 are displaced one from the other, the formed sheet portions 35 are placed in position on mold surface 43. The mold parts then are closed to form the cavity and and brought into position with an extruder so that the mold part 40 is sealably connected with the extruder for introduction of extrudate from the extruder outlet orifice to runner 44 and to feed lines 45 and 46 onto formed lining portions 35 to form molded chocolate article portions 47. After filling of the mold cavity, extrusion pressure is released, the mold is moved from the extruder and the mold part 40 is removed from mold part 41.

Mold part 41 further is comprised of two hinged portions 50 and 51. Portions 50 and 51 are brought together to form the two hemispheres of the molded product and lining material into a sphere. Portions 50 and 51 preferably contain means for heat sealing lining material sheet 32, after which the spherical product 60 is removed from the mold portions, trimmed and conveyed away on conveyor 70.

EXAMPLES

The following Examples further illustrate the present invention.

Example 1

In operation of an apparatus as illustrated in FIG. 1, chocolate buttons 19 having a temperature of about 23° C. are dropped in feed opening 16 of the extruder which also has a temperature of about 23° C. The ram is advanced hydraulically to effect a pressure of about 80 bars. Semi-continuous solid non-pourable rods issue from extruder opening 18, and these rods retain their shape and have an initial flexibility which lasts for about 40 minutes.

Example 2

In operation of an apparatus as illustrated in FIG. 2, piston 21 is displaced from cylinder 20, and chocolate buttons 19 having a temperature of about 23° C. are placed in the cylinder. Metal piston 21 is placed in the cylinder 20 on top of the buttons 19, and hydraulic pump 22 is used to push the piston into the cylinder to effect a pressure on the chocolate of about 80 bars and extrude the chocolate from cylinder opening 23 into mold runner 26 and into cavity 27 lined with a vacuum-preformed lining material 28 such as a 50$\mu$ polyethylene film. The chocolate extrudate 29 issues into the mold cavity against the lining material and fills the mold while still at a temperature of 23° C. When the mold is full, pressure is released and the mold is opened. The lining material is removed with the chocolate shell contained by it.

As is clear from the foregoing, various modifications of the present invention may be made without departure from the spirit and scope of the disclosure, and the invention may be practiced suitably in the absence of elements and/or process steps not specifically disclosed herein.

I claim:

1. A process for preparing a shaped fat-based confectionery article comprising lining a mold cavity portion of a two-part mold, wherein the mold comprises at least two mold cavity portion surfaces and a passage which leads to the mold cavity, with a lining material so that at least one cavity portion surface is lined to obtain a lined mold cavity, extruding and issuing to the mold a fat-based confectionery substance so that a fat-based substance extrudate flow issues to the mold under pressure and at a temperature below the pour point of the substance and without constricting the extrudate flow, through the mold passage into the lined mold cavity to fill the lined mold cavity with the extrudate to obtain a shaped article within the mold, releasing the filled, lined mold from extrusion pressure and demolding the shaped article and lining material from the mold.

2. A process according to claim 1 wherein the process is carried out without heating the mold prior to or during extruding and issuing the substance to fill the mold.

3. A process according to claim 1 or 2 wherein the process is carried out without affirmatively cooling the mold prior to, during or after extruding and issuing the substance to fill the mold.

4. A process according to claim 1 wherein there are a plurality of the molds and further comprising lining at least one cavity portion surface of each of the plurality of molds to obtain a plurality of lined mold cavities and wherein there are a plurality of extrudate flows issued to the molds and each extrudate flow is issued separately, without constricting the flow, to a separate mold to obtain a shaped article in the lined mold cavity of each mold.

5. A process according to claim 1 or 2 wherein the process is carried out without affirmatively cooling the fat-based substance and extrudate and without affirmatively cooling the shaped article.

6. A process according to claim 1 wherein the shaped article is demolded statically and integrally with the lining material.

7. A process according to claim 5 wherein the shaped article is demolded statically and integrally with the lining material.

8. A process according to claim 1 wherein the shaped article and lining material are demolded statically and integrally before the shaped article sets.

9. A process according to claim 7 wherein the shaped article and lining material are demolded before the shaped article sets.

10. A process according to claim 1 further comprising cooling the mold so that the shaped article is cooled before the shaped article and lining material and are demolded.

11. A process according to claim 10 wherein after the mold cavity is filled to obtain the shaped article, the shaped article is cooled for less than one minute and then the shaped article and lining material are demolded integrally.

12. A process according to claim 10 wherein after the mold cavity is filled to obtain the shaped article, the shaped article is cooled for less than 30 seconds and then the shaped article and lining material are demolded integrally.

13. A process according to claim 10 or 12 wherein the mold is cooled to a temperature of from about 8° C. to 15° C.

14. A process according to claim 10 wherein the shaped article and lining material are demolded integrally before the shaped article sets.

15. A process according to claim 1 wherein the substance is set chocolate.

16. A process according to claim 1 or 15 wherein the substance comprises at least about 20% by weight fat.

17. A process according to claim 1 or 15 wherein the substance comprises about 25% to about 50% by weight fat.

* * * * *